(12) United States Patent
Wang et al.

(10) Patent No.: US 11,347,323 B2
(45) Date of Patent: May 31, 2022

(54) METHOD FOR DETERMINING TARGET KEY IN VIRTUAL KEYBOARD

(71) Applicant: BAIDU INTERNATIONAL TECHNOLOGY (SHENZHEN) CO., LTD., Shenzhen (CN)

(72) Inventors: Qiaofei Wang, Shenzhen (CN); Gang Qiao, Shenzhen (CN); Ting Li, Shenzhen (CN)

(73) Assignee: BAIDU INTERNATIONAL TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/344,512

(22) Filed: Jun. 10, 2021

(65) Prior Publication Data

US 2021/0303080 A1    Sep. 30, 2021

(51) Int. Cl.
*G06F 3/023* (2006.01)
*G06F 3/04886* (2022.01)

(52) U.S. Cl.
CPC ........ *G06F 3/0237* (2013.01); *G06F 3/04886* (2013.01)

(58) Field of Classification Search
CPC ................ G06F 3/0237; G06F 3/04886
See application file for complete search history.

(56) References Cited

U.S. PATENT DOCUMENTS

| | | | | |
|---|---|---|---|---|
| 10,073,536 B2* | 9/2018 | Ou | | G06F 3/018 |
| 10,296,581 B2* | 5/2019 | Willmore | | G06F 40/232 |
| 10,929,014 B2* | 2/2021 | Li | | G06F 3/04886 |
| 2005/0270270 A1* | 12/2005 | Chadha | | G06F 3/0236 |
| | | | | 345/157 |
| 2005/0275632 A1* | 12/2005 | Pu | | G06F 3/04886 |
| | | | | 345/171 |
| 2009/0174667 A1* | 7/2009 | Kocienda | | G06F 3/04895 |
| | | | | 345/169 |
| 2010/0036655 A1* | 2/2010 | Cecil | | G06F 40/274 |
| | | | | 704/10 |
| 2011/0193797 A1* | 8/2011 | Unruh | | G06F 3/04883 |
| | | | | 345/173 |
| 2011/0317194 A1* | 12/2011 | Nakanishi | | G06F 3/0237 |
| | | | | 358/1.13 |
| 2013/0332822 A1* | 12/2013 | Willmore | | G06F 40/289 |
| | | | | 715/257 |
| 2013/0339895 A1* | 12/2013 | Hirshberg | | G06F 3/0237 |
| | | | | 715/773 |
| 2014/0198048 A1* | 7/2014 | Unruh | | G06F 3/04886 |
| | | | | 345/168 |
| 2014/0201671 A1* | 7/2014 | Zhai | | G06F 40/263 |
| | | | | 715/773 |

(Continued)

*Primary Examiner* — Matthew Ell
*Assistant Examiner* — Kenny Nguyen
(74) *Attorney, Agent, or Firm* — Fay Sharpe LLP

(57) ABSTRACT

An input method for a virtual keyboard includes: in response to acquiring a click operation on the virtual keyboard, determining a click position of the click operation; determining a first probability that the click operation belongs to each key based on the click position and a current response region corresponding to each key in the virtual keyboard; determining a second probability that the click operation belongs to each key based on an input character sequence; and determining a target key corresponding to the click operation based on the first probability and the second probability for each key.

20 Claims, 4 Drawing Sheets

(56) References Cited

U.S. PATENT DOCUMENTS

| | | | | |
|---|---|---|---|---|
| 2015/0301740 A1* | 10/2015 | Bozzini | ............... | G06F 3/04847 |
| | | | | 715/773 |
| 2015/0347383 A1* | 12/2015 | Willmore | .............. | G06F 40/274 |
| | | | | 704/9 |
| 2016/0026258 A1* | 1/2016 | Ou | ........................ | G06F 40/274 |
| | | | | 715/773 |
| 2017/0052702 A1* | 2/2017 | Norris, III | .......... | G06F 3/04886 |
| 2018/0107380 A1* | 4/2018 | Kandur Raja | ........ | G06F 3/0237 |
| 2020/0081618 A1* | 3/2020 | Li | ........................ | G06F 3/0481 |
| 2021/0303080 A1* | 9/2021 | Wang | ................... | G06F 3/0237 |

\* cited by examiner

METHOD FOR DETERMINING TARGET KEY IN VIRTUAL KEYBOARD

TECHNICAL FIELD

The present disclosure relates to a field of artificial intelligence (AI) technologies such as natural language processing (NLP), deep learning (DL), etc., and particularly to an input method and an input apparatus for a virtual keyboard, an electronic device and a storage medium.

BACKGROUND

With the rapid development of computer technology, the users use the internet more and more frequently. In the Internet activity, the main communication mode is using a mobile device (such as a smartphone, a tablet computer, etc.) by users for text communication. A virtual keyboard is a main tool for the mobile device to input a text. Due to the size limitation of mobile devices, the keys of the virtual keyboard are relatively small, and false touching may occur easily in the user's input process. In the process of using a virtual keyboard, it has become an urgent problem to be solved how to reduce the probability of false recognition and improve the accuracy of recognition.

SUMMARY

According to an aspect of the present disclosure, an input method for a virtual keyboard includes: in response to acquiring a click operation on the virtual keyboard, determining a click position of the click operation; determining a first probability that the click operation belongs to each key based on the click position and a current response region corresponding to each key in the virtual keyboard; determining a second probability that the click operation belongs to each key based on an input character sequence; and determining a target key corresponding to the click operation based on the first probability and the second probability for each key.

According to another aspect of the present disclosure, an electronic device includes: at least one processor and a memory stored with instructions executable by the at least one processor. The at least one processor is configured to, in response to acquiring a click operation on the virtual keyboard, determine a click position of the click operation; determine a first probability that the click operation belongs to each key based on the click position and a current response region corresponding to each key in the virtual keyboard; determine a second probability that the click operation belongs to each key based on an input character sequence; determine a target key corresponding to the click operation based on the first probability and the second probability corresponding to the each key.

According to another aspect of the present disclosure, a non-transitory computer-readable storage medium having computer instructions stored thereon is provided. The computer instructions are configured to cause a computer to execute an input method for a virtual keyboard. The method includes: in response to acquiring a click operation on the virtual keyboard, determining a click position of the click operation; determining a first probability that the click operation belongs to each key based on the click position and a current response region corresponding to each key in the virtual keyboard; determining a second probability that the click operation belongs to each key based on an input character sequence; and determining a target key corresponding to the click operation based on the first probability and the second probability for each key.

It should be understood that, the content described in the section is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings herein are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

The Artificial intelligence (AI) is a subject that studies simulating certain thinking processes and intelligent behaviors (such as learning, reasoning, thinking, planning, etc.) of human beings by a computer, which covers both hardware-level technologies and software-level technologies. The AI hardware technologies generally include technologies such as sensors, dedicated AI chips, cloud computing, distributed storage, big data processing, etc. The AI software technologies mainly include a computer vision technology, a speech recognition technology, a natural language processing (NLP) technology as well as several main directions such as machine learning (ML), deep learning (DL), big data processing technology, knowledge graph (KG) technology, etc.

The Natural language processing (NLP) is a cross discipline of computer science and linguistics that processes, understands and uses human languages (for example, Chinese, English, etc.) by a computer, often referred to as computational linguistics. The natural language is a fundamental symbol that human beings are different from other animals. Without languages, there will be no human being's thinking. Therefore, the NLP embodies the highest task and level of AI, that is, the machine may achieve true intelligence only when the computer has the ability to process the natural language.

The Deep learning (DL) refers to an artificial neural network with multiple layers and a method for training the same. A layer of neural network takes a large number of matrix numbers as an input, takes a weight through a non-linear activation method, and generates another data set as an output. With the appropriate matrix quantity, multiple layers of organizations are linked together to form a neural network "brain" for precise and complicated processing, as if one identifies a marked picture of an object.

An input method and an input apparatus for a virtual keyboard, an electronic device and a storage medium are described referring to figures in embodiments of the present disclosure.

The input method for a virtual keyboard in embodiments of the present disclosure may be executed by an input apparatus for a virtual keyboard, which is configured in an electronic device.

For convenience of descriptions, the input apparatus for a virtual keyboard in the present disclosure is abbreviated as an "input apparatus".

Figure 1:
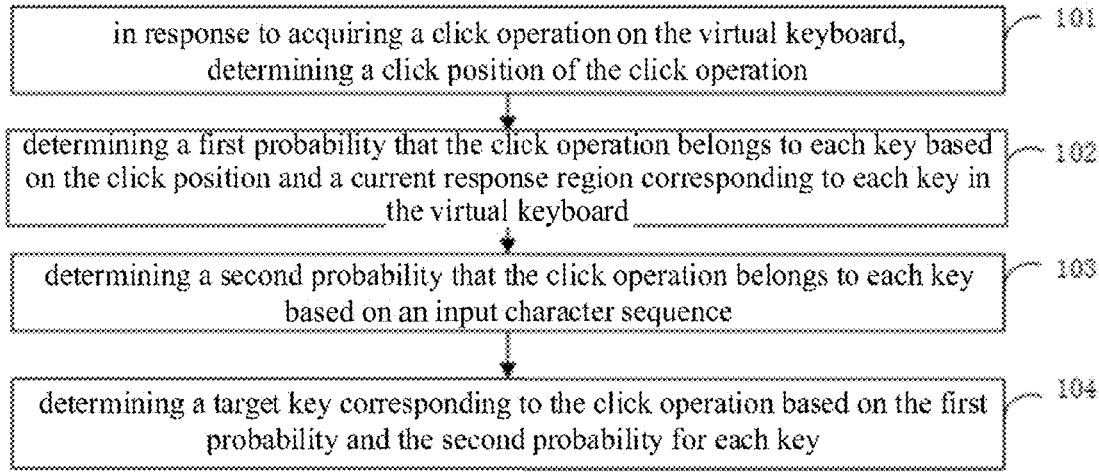
FIG. 1 is a flowchart illustrating an input method for a virtual keyboard according to an embodiment of the present disclosure.

FIG. 1 is a flowchart illustrating an input method for a virtual keyboard according to the embodiment of the present disclosure.

As illustrated in FIG. 1, the input method for a virtual keyboard may include the following blocks.

At block 101, in response to acquiring a click operation on the virtual keyboard, a click position of the click operation is determined.

It may be understood that when a user uses a virtual keyboard, the keys in the virtual keyboard may be clicked to input corresponding characters. Thus, when the input apparatus acquires a click operation on the virtual keyboard from the user, the corresponding click position may be determined based on the click operation from the user.

For example, the input apparatus may establish an x-y two-dimensional coordinate system with a left lower vertex of the virtual keyboard as a coordinate origin. Thus, when the user clicks a certain position in the virtual keyboard, the input apparatus may determine the coordinates or the like for the click position based on the click operation from the user.

Alternatively, the input apparatus may set other point in the virtual keyboard as a coordinate origin, such as taking a center point of the virtual keyboard as the coordinate origin, to establish a two-dimensional coordinate system. Thus, when the user clicks a certain position in the virtual keyboard, the input apparatus may determine the coordinates or the like for the click position based on the click operation from the user.

It should be noted that the above examples are illustrated only and are not intended to be a limitation on a click position and the way of determining the click position in embodiments of the present disclosure.

At block 102, a first probability that the click operation belongs to each key is determined based on the click position and a response region currently corresponding to each key in the virtual keyboard.

The response region is a "virtual" touch region for the key. When the click position is within a response region for a certain key, it may be determined that the click operation belongs to the key.

It may be understood that the response region of the key in the present disclosure may differ from or may be same with its region displayed in the display screen, which is not limited in the present disclosure.

For example, for a key A, the coordinates of four vertexes in its response region are determined as $(x_1, y_1)$, $(x_2, y_2)$, $(x_3, y_3)$ and $(x_4, y_4)$. Thus, the input apparatus compares the click position for the click operation of the user with the current response region of the key A. When the click position for the click operation is in the response region of the key A, it may be determined that the click operation belongs to the key A, and a first probability that the click operation belongs to the key A may be thus determined. Then, the click position may be compared with the response region corresponding to each of the remaining keys, so that a first probability that the click operation belongs to each of the remaining keys may be determined based on a position relationship between the click position and the response regions corresponding to each of the remaining keys.

It should be noted that the above examples are illustrated only and are not intended to be a limitation on a response region corresponding to the key and its vertex coordinates, and the way of determining a first probability in the embodiments of the present disclosure.

It may be understood that the click position may also be on the boundary of the response regions corresponding to the two keys. At this point, the first probability that the click operation belongs to one of the two keys are the same as that the click operation belongs to the other of the two keys, such as 0.5, 0.7, etc., which are not limited here.

At block 103, a second probability that the click operation belongs to each key is determined based on an input character sequence.

The input character sequence may be a character, or a word, or a sentence, etc., which is not limited in the present disclosure.

For example, the input character sequence is "我是中(WO SHI ZHONG, pinyin)", the corresponding language model may be adopted to predict that the next possible character of "WO SHI ZHONG" are "G" or "H", and the probability of "G" is 0.85, and the probability of "H" is 0.7. Thus, the input apparatus may determine that the second probability that the click operation belongs to the key "G" is 0.85, and the second probability that the click operation belongs to the key "H" is 0.7.

It should be noted that the above examples are illustrated only and are not intended to be a limitation on a second probability in embodiments of the present disclosure.

It may be understood that a language model may be any model that may perform a probability prediction on characters, such as a statistical language model, a neural network language model, etc., which is not limited in the present disclosure.

It may be understood that when there is no input character sequence, a value of the second probability that the click operation belongs to each key may be set in advance, or the second probability that the click operation belongs to each key may be set as the same, such as 0.5, 0.6, etc., which is not limited in the present disclosure.

At block 104, a target key corresponding to the click operation is determined based on the first probability and the second probability for each key.

There may be many ways of determining a target key corresponding to the click operation.

For example, the first probability and the second probability for each key may be added first to obtain a click probability for each key. Then, a key with the maximum click probability may be determined as a target key. Thus, a probability of false recognition may be effectively reduced.

Alternatively, the first probability and the second probability for each key may be multiplied by its respective weight and the multiplications are then added, to obtain a click probability of each key fused based on each weight. Then a key with the maximum click probability may be determined as a target key, so that a probability of false recognition may be effectively reduced.

The weights respectively corresponding to the first probability and the second probability may be the values set in advance, for example, the weight corresponding to the first probability is 0.65, and the weight corresponding to the second probability is 0.35. Alternatively, the weight corresponding to the first probability is 0.7 and the weight corresponding to the second probability is 0.3, which are not limited in the present disclosure.

It should be noted that the above examples are illustrated only and are not intended to be a limitation on fusing a first probability and a second probability for each key in embodiments of the present disclosure.

It may be understood that the input apparatus may display the recommended characters on the display screen based on the determined target key. For example, the target key determined by the input apparatus is "G", the recommended characters displayed on the display screen may be 国 (GUO), 过 (GUO), 哥 (GE), etc. Or the target key determined by the input apparatus is "H", the recommended characters displayed on the display screen may be 华 (HUA), 好 (HAO), 和 (HE), etc. When there are characters to be input by the user in the plurality of recommended characters, the user may directly select the characters to be input, thereby effectively reducing the user's backspace rate, improving the input accuracy based on the virtual keyboard, and further improving the efficiency and providing good experiences to the user.

In the embodiments in the present disclosure, the first probability that the click operation belongs to each key is determined based on the acquired click position of the click operation and the response region currently corresponding to each key in the virtual keyboard; the second probability that the click operation belongs to each key is determined based on the input character sequence; a target key corresponding to the click operation is determined based on the first probability and the second probability for each key. Thus, multi-dimensional analysis is performed on the click operation to determine a target key, thereby reducing the probability of false recognition and improving the input accuracy based on the virtual keyboard.

In the above embodiments, multi-dimensional analysis is performed on the click operation to determine a target key, thereby reducing the probability of false recognition and improving the input accuracy based on the virtual keyboard. In a possible implementation, a response region for each key in the virtual keyboard may be updated based on the click operation from the user. The above process is further described below in combination with FIG. 2.

Figure 2:
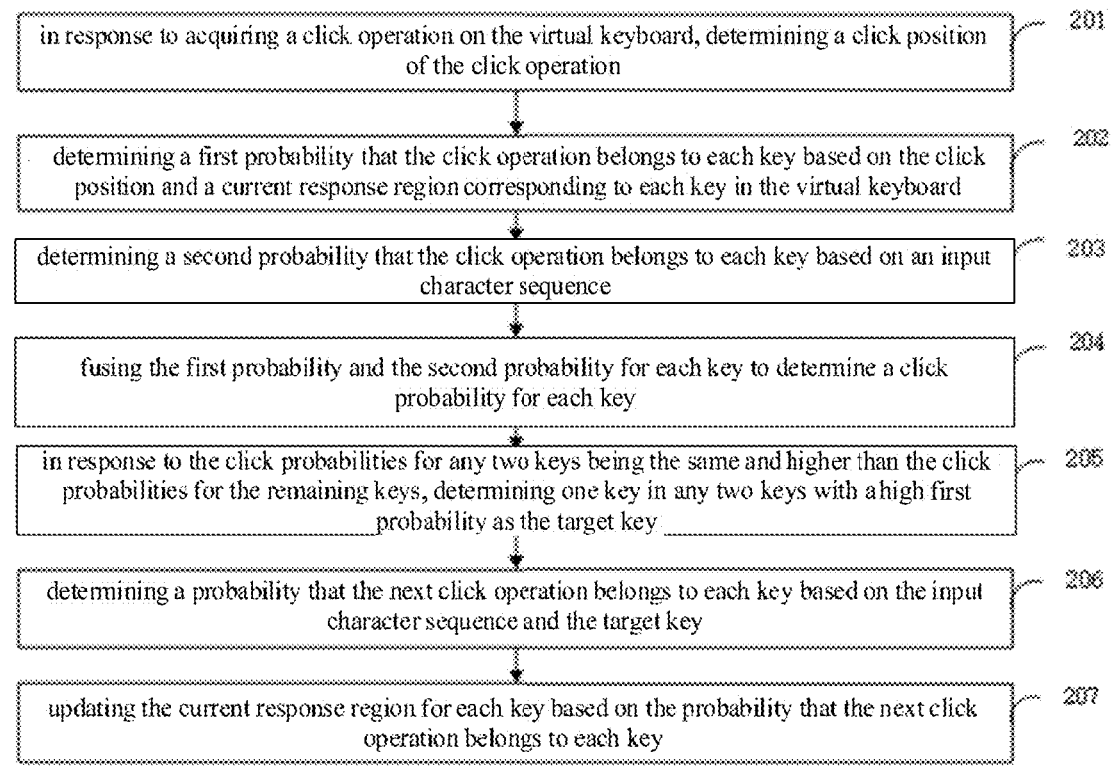
FIG. 2 is a flowchart illustrating an input method for a virtual keyboard according to another embodiment of the present disclosure.

FIG. 2 is a flowchart illustrating an input method for a virtual keyboard according to the embodiment of the present disclosure. As illustrated in FIG. 2, the input method for the virtual keyboard may include the following blocks.

At block 201, in response to acquiring a click operation on the virtual keyboard, a click position of the click operation is determined.

At block 202, a first probability that the click operation belongs to each key is determined based on the click position and a response region currently corresponding to each key in the virtual keyboard.

At block 203, a second probability that the click operation belongs to each key is determined based on an input character sequence.

At block 204, the first probability and the second probability for each key are fused to determine a click probability for each key.

There may be many ways of fusing the first probability and the second probability for each key.

For example, the first probability and the second probability for each key may be added first, and the sum is determined as a click probability for each key.

Alternatively, the first probability and the second probability for each key may be multiplied by its respective weight and the multiplications are then added, and the sum is determined as the click probability for each key.

It should be noted that the above examples are illustrated only and are not intended to be a limitation on the way of fusing a first probability and a second probability for each key in embodiments of the present disclosure.

At block 205, in response to the click probabilities for any two keys being the same and higher than the click probabilities for the remaining keys, one key in the any two keys with a high first probability is determined as the target key.

It may be understood that the first probability and the second probability for each key are fused respectively to determine the click probability for each key, in which two different keys may correspond to the same maximum click probability. At this time, the first probabilities corresponding to two keys may be compared, and the key with a high first probability is determined as the target key. Therefore, the target key determined based on the first probability more conforms to the input content of the user, which improves the input accuracy based on the virtual keyboard, reduces the backspace rate of the user in the input process, satisfies the demand of the user and provides a good sense of use with the user.

Alternatively, a plurality of different keys may correspond to the same maximum click probability. At this time, the first probability corresponding to each of the plurality of keys may be compared, and the key with the highest first probability is determined as the target key. Therefore, the target key determined based on the first probability more conforms to the input content of the user, and improves the input accuracy based on the virtual keyboard.

It should be noted that the above examples are illustrated only and are not intended to be a limitation on the way of determining a target key in embodiments of the present disclosure.

At block 206, a probability that the next click operation belongs to each key is determined based on the input character sequence and the target key.

For example, the input character sequence is "我是中 (WO SHI ZHONG, pinyin)", and the target key is "G". A language model is utilized to predict that the next character input by the user may be U. At this time, it may be determined that the probability that the user clicks the key U next time is high, so that the probability that the next click operation belongs to the key U may be determined, such as may be 0.6, 0.8, etc. Then, the probability that the next click operation belongs to the remaining keys may be determined based on a matching degree between the characters corresponding to the remaining keys and the "我是中 (WO SHI ZHONG, pinyin)" and "G".

Alternatively, the matching degree between the characters corresponding to each key with the input character sequence and the target key may be determined directly first, for example, each matching degree may be determined by semantic similarity or using a language model, etc. Then, a probability that the next click operation belongs to each key is determined based on each matching degree. For example, the greater the matching degree corresponding to the key is, the higher the probability that the next click operation belongs to the key is, and the smaller the matching degree corresponding to the key is, the lower the probability that the next click operation belongs to the key is.

It should be noted that the above examples are illustrated only and are not intended to be a limitation on a probability that the next click operation belongs to each key and the way of determining a probability that the next click operation belongs to each key in embodiments of the present disclosure.

It may be understood that, when there is no input character sequence, a probability that the next click operation belongs to each key is determined directly based on the target key.

When the target key is a letter A, each matching degree between the letter A and each of the remaining keys may be determined respectively, thus, the probability that the next click operation belongs to each key is determined based on each matching degree, which is not limited in the present disclosure.

At block 207, a response region for each key is updated based on the probability that the next click operation belongs to each key.

There may be many ways of updating a response region for each key.

For example, a response region for each key may be adjusted in different degrees based on the probability that the next click operation belongs to each key.

For example, the higher the probability that the next click operation belongs to a certain key is, the larner the adjustment to the response region for the key may be, and the lower the probability that the next click operation belongs to a certain key is, the smaller the adjustment to the response region for the key may be, etc., which is not limited in the present disclosure.

Alternatively, a threshold may be set in advance, in the probability that the next click operation belongs to each key, the response region is enlarged such as to 1.1 times of the original size for each key whose probability is greater than the threshold, for example, and the response region is reduced such as to 0.8 times of the original size for each key whose probability is lower than the threshold.

Alternatively, a first threshold and a second threshold may also be set in advance. For example, the first threshold is 0.9 and the second threshold is 0.3, so that the response region is enlarged to 1.2 times of the original size for each of the keys whose probability (that the next click operation belongs to each of the keys) is greater than the first threshold, and the response region is reduced to 0.7 of the original size for each of the keys whose probability is smaller than the second threshold, the response region is kept unchanged for the remaining keys whose probability is between the first threshold and the second threshold, etc.

It should be noted that the above examples are illustrated only and are not intended to be a limitation on the way of updating a response region for each key in embodiments of the present disclosure.

In embodiments of the present disclosure, the response region for each key in the virtual keyboard is updated in time, which may effectively enhance the accuracy of recognizing input characters, further reduce the backspace rate of the user in the input process, enhance efficiency and further enhance the user experience.

In the embodiments of the present disclosure, the first probability that the click operation belongs to each key is determined based on the acquired click position of the click operation and the response region currently corresponding to each key in the virtual keyboard; the second probability that the click operation belongs to each key is determined based on the input character sequence; the click probability for each key is determined based on the first probability and the second probability for each key, and the corresponding target key is further determined; based on the input character sequence and the target key, the probability that the next click operation belongs to each key may be determined, the response region for each key may be further updated. Thus, multi-dimensional analysis is performed on the click operation to determine the probability that the next click operation belongs to each key, and the response region for each key may be then updated in time, thereby reducing the probability of false recognition and improving the input accuracy based on the virtual keyboard.

In the above embodiments, multi-dimensional analysis is performed on the click operation to determine the probability that the next click operation belongs to each key, and the response region for each key may be then updated in time, thereby reducing the probability of false recognition and improving the input accuracy based on the virtual keyboard. In a possible implementation, a reference distribution region for each key may be determined first, and then the response region for each key is updated. The above process is described in details below in combination with FIG. 3.

Figure 3:
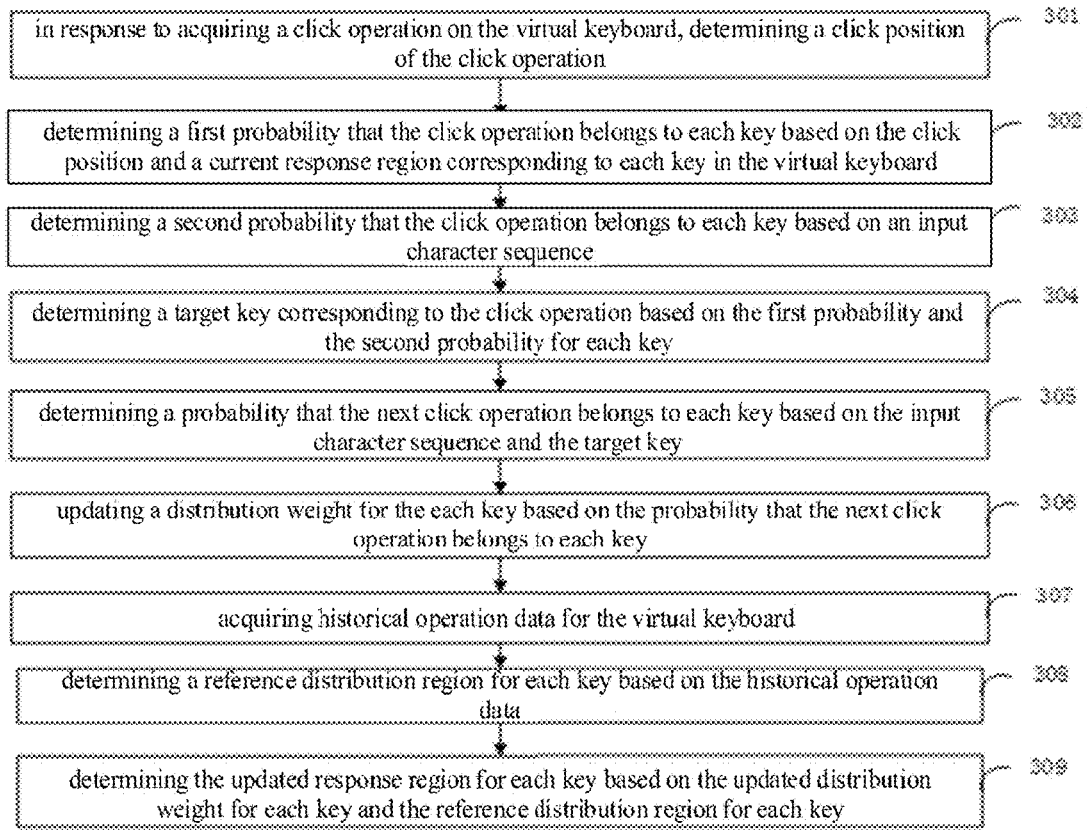
FIG. 3 is a flowchart illustrating an input method for a virtual keyboard according to yet another embodiment of the present disclosure.

FIG. 3 is a flowchart illustrating an input method for a virtual keyboard according to the embodiment of the present disclosure. As illustrated in FIG. 3, the input method for the virtual keyboard may include the following blocks.

At block 301, in response to acquiring a click operation on the virtual keyboard, a click position of the click operation is determined.

At block 302, a first probability that the click operation belongs to each key is determined based on the click position and a response region currently corresponding to each key in the virtual keyboard.

There may be many ways of determining a first probability that a click operation belongs to each key.

For example, the click position for the click operation of the user may be compared with the response region for each key, so that a first probability that the click operation belongs to each key may be determined based on a position relationship between the click position and the response region corresponding to the each key.

Alternatively, the response region for each key may be represented by a Gaussian distribution. Thus, a first probability that the click operation belongs to each key may be determined with the following formula (1):

$$p(c \mid v) = \frac{\phi * N(v \mid \mu_c, \theta_c)}{\sum_{j=1}^{K} \phi * N(v \mid \mu_j, \theta_j)} \quad (1)$$

where the click operation v of the user may be denoted as v=(x, y), x and y are an abscissa and an ordinate for the click position of the click operation of the user, N represents a Gaussian distribution currently corresponding to a certain key C, φ represents a distribution weight currently for the certain key C, $\mu_c$, $\theta_c$ is a mean and variance of the Gaussian distribution for the certain key C, and $\mu_j$, $\theta_j$ is a mean and variance of the Gaussian distribution for any key j in the virtual keyboard, and K is a number of keys in the virtual keyboard.

It may be understood that when the click operation of the user is a first click operation in the round of click operation, the Gaussian distribution currently corresponding to each key and the currently corresponding distribution weight may be an initial value obtained by analyzing and processing the historical operation data of the virtual keyboard; alternatively, a plurality of click operations have been performed before the user's click operation, at this time, the Gaussian distribution currently corresponding to each key and the currently corresponding distribution weight may be updated based on the previous click operation, which is not limited in the present disclosure.

Thus, after the user inputs a certain character, the input apparatus may determine a probability that the click operation belongs to each key based on the click position of the click operation of the user, the distribution weight of each key, and the Gaussian distribution corresponding to each key.

It should be noted that, the acquisition, storage and application of historical operation data involved in the in the technical solutions of the present disclosure conform to the provisions of relevant legal regulations, and do not violate the public order and moral.

At block 303, a second probability that the click operation belongs to each key is determined based on an input character sequence.

Optionally, a number of input characters to be acquired may be determined based on the language input type currently corresponding to the virtual keyboard, and then a character sequence with the number of the input characters to be acquired may be acquired from the input characters based on the input order of each input character from back to front.

There may be many language input types, for example, a Chinese input, an English input, a French input, etc., which are not limited in the present disclosure.

For example, when the language input type currently corresponding to the virtual keyboard is the Chinese input, the number of input characters to be acquired may be set relatively smaller, such as, 1, 2, 4, etc. Alternatively, when the language input type currently corresponding to the virtual keyboard is the English input, the number of input characters to be acquired may be set relatively larger, such as, 6, 8, etc., which is not limited in the present disclosure.

For example, the language input type currently corresponding to the virtual keyboard is the Chinese input, the corresponding number of the input characters to be acquired is 4, and each character input in turn is " 我以自己为中华儿 (WO YI ZIJI WEI ZHONG HUA ER, pinyin)". In this case, the corresponding character sequence acquired based on the order from back to front is " 为中华儿 (WEI ZHONG HUA ER)".

It should be noted that the above examples are illustrated only and are not intended to be a limitation on the number of input characters to be acquired and the corresponding sequence of characters in the embodiments of the present disclosure, etc.

In the embodiments of the present disclosure, the number of inputted characters to be acquired may be determined based on the language input type currently corresponding to the virtual keyboard, thereby determining the input character sequence to be acquired more completely, clearly and accurately. Then the second probability that the click operation belongs to each key may be determined by performing semantic analysis on the complete and accurate input character sequence, so that the acquired second probability accuracy is higher.

At block 304, a target key corresponding to the click operation is determined based on the first probability and the second probability for each key.

At block 305, a probability that the next click operation belongs to each key is determined based on the input character sequence and the target key.

At block 306, a distribution weight for each key is updated based on the probability that the next click operation belongs to each key.

There may be many ways of updating a distribution weight for each key.

For example, the distribution weight for each key and the probability that the next click operation belongs to each key may be in a positive correlation. Accordingly, the higher the probability that the next click operation belongs to each key is, the larger the distribution weight for each key is, and the lower the probability that the next click operation belongs to each key is, the smaller the distribution weight for each key is.

Alternatively, a third threshold value and a fourth threshold value may also be set in advance, the distribution weight is set as 0.6 for each of the keys whose probability (that the next click operation belongs to each of the keys) is greater than the third threshold value, the distribution weight is set as 0.1 for each key whose probability is smaller than the fourth threshold value, and the distribution weight is set as 0.3 for each of the keys whose probability is between the third threshold value and the fourth threshold value, etc.

It should be noted that the above examples are illustrated only and are not intended to be a limitation on a distribution weight for each key and the way of updating a distribution weight for each key in embodiments of the present disclosure.

At block 307, historical operation data on the virtual keyboard is acquired.

At block 308, the reference distribution region for each key is determined based on the historical operation data.

The reference distribution region may be represented by a region enclosed by its respective vertex coordinates, and may also be represented by a Gaussian distribution, which is not limited in the present disclosure.

For example, by analyzing and processing data such as the coordinates of the historical click operation of the virtual keyboard and the key to which each historical click operation belongs, the corresponding relationship between the coordinates of the historical click operation and the key to which each historical click operation belongs may be accurately determined, and the reference distribution region for each key is further determined, etc., which is not limited in the present disclosure.

It may be understood that, when the reference distribution region for each key is represented by the Gaussian distribution, the mean and variance, etc. of the reference distribution region for each key may also be determined based on the historical operation data.

It should be noted that, the acquisition, storage, and application of historical operation data involved in the technical solutions of the present disclosure conform to the provisions of relevant legal regulations, and do not violate the public order and moral.

At block 309, the updated response region for each key is determined based on the updated distribution weight for each key and a reference distribution region for each key.

There may be many ways of determining an updated response region for each key.

For example, based on the updated distribution weight for each key, a reference distribution region for each key may be adjusted in proportion, and an updated response region for each key may be determined.

For example, the updated distribution weight value of a key A is 20% larger than the previous distribution weight value, so that the reference distribution region for the key A may be enlarged to 1.2 times; the updated distribution weight value of a key S is reduced by 30%, compared with the previous distribution weight value, so that the reference distribution region for key A may be reduced to 0.7 times of the original one, which is not limited in the present disclosure.

It should be noted that the above examples are illustrated only and are not intended to be a limitation on the way of determining an updated response region for each key in embodiments of the present disclosure.

It may be understood that, the reference distribution region for each key in the present disclosure may be initially determined by analyzing and processing historical operation data of the virtual keyboard at first, or may be an updated response region for each key of the previous click operation, etc., which is not limited in the present disclosure.

For example, when the click operation of the user is the first click operation in the round of click operation, the reference distribution region for each key may be initially determined by analyzing and processing the historical operation data of the virtual keyboard. Alternatively, a plurality of click operations have been performed before the user's click operation, at this time, the reference distribution region for each key may be an updated response region for each key based on the previous click operation, which is not limited in the present disclosure.

Optionally, in order to provide better experience with the user, in the embodiments of the present disclosure, a display mode of the each key may be updated based on the probability that the next click operation belongs to each key.

There may be many ways of updating a display mode of each key.

For example, a fifth threshold may be set in advance, and each of the keys whose probability (that the next click operation belongs to each of the keys) is greater than the fifth threshold may be set to keep flashing, or a background color for the keys may be highlighted, etc., which is not limited in the present disclosure.

Alternatively, based on the value size of the probability for each key that the next click operation belongs to, a background color with different brightness for each key may be set or different background colors may be set for each key, etc.

It should be noted that the above examples are illustrated only and are not intended to be a limitation on updating a display mode of each key in embodiments of the present disclosure.

Figure 3A:
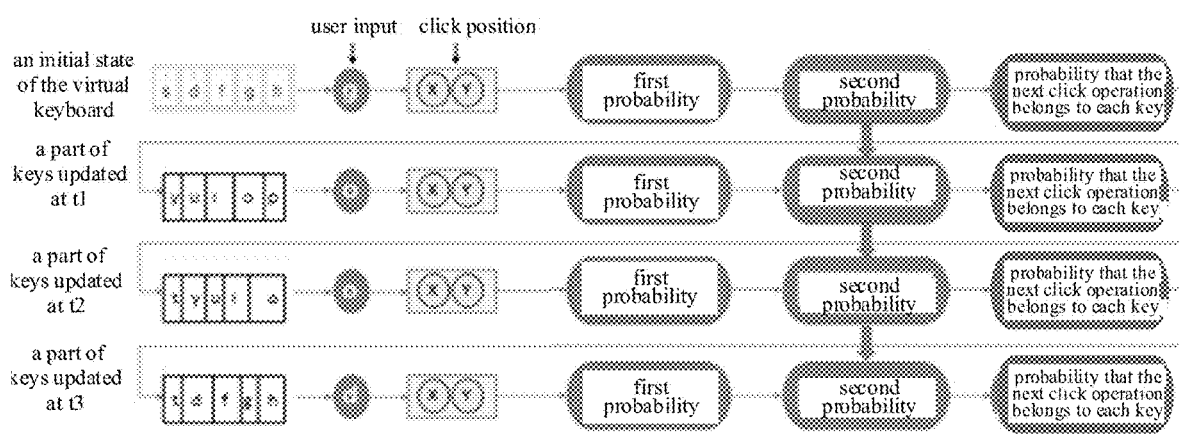
FIG. 3a is a diagram illustrating key updating for a virtual keyboard according to an embodiment of the present disclosure.

The following illustrates an input method for a virtual keyboard according to the present disclosure with FIG. 3*a* as an example.

The response region for each key in an initial state of the virtual keyboard is illustrated in FIG. 3*a*, the user inputs a character "g", and after the input apparatus obtains the click operation from the user, the corresponding click position may be determined. Then, a first probability that the click operation belongs to each key may be determined based on the click position and a response region for each key, and a second probability that the click operation belongs to each key is then determined by a language model. A probability that the next click operation belongs to each key may be further determined, and a response region for each key in the virtual key may be updated. At time t1, the updated response regions for a part of keys are shown in the figure, and it can be seen that the response region for the key "o" at this time is slightly larger than that for other keys.

Thereafter, the user continues to input the character "o", and the input apparatus may determine the corresponding click position based on the user's click operation. Further, the first probability, the second probability, and the probability that the next click operation belongs to each key are determined, and the response region for each key is updated. At time t2, the updated response regions for a part of keys are shown in the figure, and it can be seen that the response region for the key "o" at this time is slightly larger than that for other keys.

Thereafter, the user inputs a character "d", and through the above processing, the updated response regions for a part of keys as shown may be obtained. It can be seen that the response region for the key "d" is slightly larger than that of other keys.

Therefore, in the input method for the virtual keyboard according to the present disclosure, the target key may be accurately determined, the probability that the next click operation belongs to each key may be accurately predicted, and the response region for the key may be updated, so that the input accuracy based on the virtual keyboard may be improved, the backspace rate in the user's input process may be effectively reduced, and the user experience may be further improved.

In the embodiments of the present disclosure, the first probability that the click operation belongs to each key is determined based on the acquired click position of the click operation and the response region currently corresponding to each key in the virtual keyboard; the second probability that the click operation belongs to each key is determined based on the input character sequence; the click probability for each key is determined based on the first probability and the second probability for each key, and the corresponding target key is further determined; the probability that the next click operation belongs to each key may be determined based on the input character sequence and the target key; the distribution weight for each key is updated based on the probability that the next click operation belongs to each key; the updated response region for each key is then determined based on the updated distribution weight for each key and the reference distribution region for each key, and the response region for each key may be further updated. Thus, multi-dimensional analysis is performed on the click operation to update the distribution weight for each key and the response region for each key may be updated in time based on the reference distribution region for each key, thereby reducing the probability of false recognition and improving the input accuracy based on the virtual keyboard.

In order to implement the above embodiments, the present disclosure further provides an input apparatus for a virtual keyboard.

Figure 4:
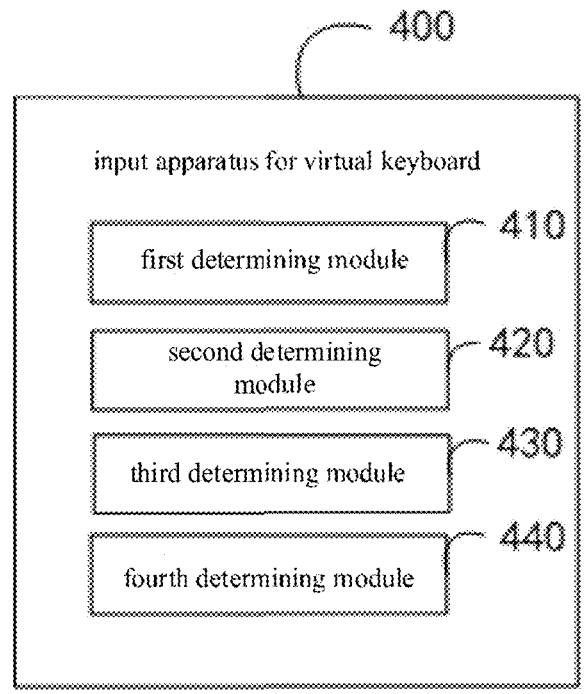
FIG. 4 is a structural diagram illustrating an input apparatus for a virtual keyboard according to an embodiment of the present disclosure.

FIG. 4 is a structural diagram illustrating an input apparatus for a virtual keyboard according to the embodiment of the present disclosure.

As illustrated in FIG. 4, the input apparatus 400 for a virtual keyboard may include a first determining module 410, a second determining module 420, a third determining module 430 and a fourth determining module 440.

The first determining module 410 is configured to, in response to acquiring a click operation on the virtual keyboard, determine a click position of the click operation.

The second determining module 420 is configured to determine a first probability that the click operation belongs to each key based on the click position and a response region currently corresponding to each key in the virtual keyboard.

The third determining module 430 is configured to determine a second probability that the click operation belongs to each key based on an input character sequence.

The fourth determining module 440 is configured to determine a target key corresponding to the click operation based on the first probability and the second probability corresponding to the each key.

The functions and specific implementation principles of each module in embodiments of the present disclosure may refer to each of the method embodiments, which is not repeated here.

For the input apparatus for a virtual keyboard in the embodiments in the present disclosure, the first probability that the click operation belongs to each key is determined based on the acquired click position of the click operation and the response region currently corresponding to each key in the virtual keyboard; the second probability that the click operation belongs to each key is determined based on the input character sequence; the target key corresponding to the click operation is further determined based on the first probability and the second probability for each key. Thus, multi-dimensional analysis is performed on the click operation to determine a target key, thereby reducing the probability of false recognition and improving the input accuracy based on the virtual keyboard.

Figure 5:
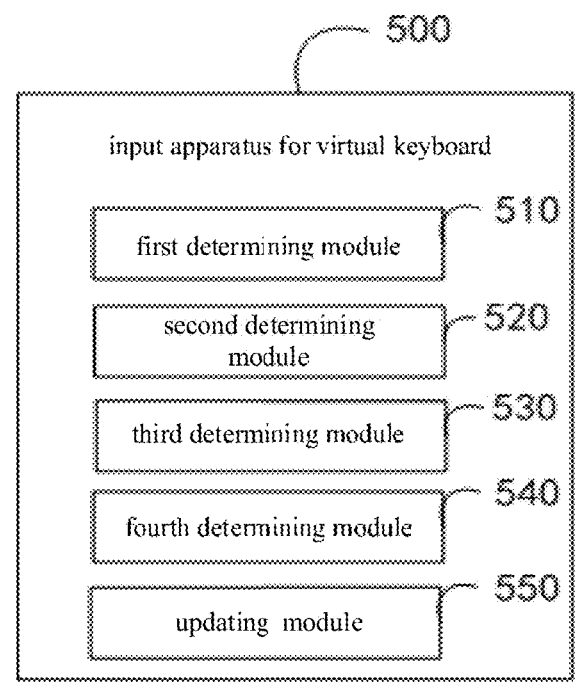
FIG. 5 is a structural diagram illustrating an input apparatus for a virtual keyboard according to another embodiment of the present disclosure.

FIG. 5 is a structural diagram illustrating an input apparatus for a virtual keyboard according to the embodiment of the present disclosure.

As illustrated in FIG. 5, the input apparatus 500 for a virtual keyboard may include a first determining module 510, a second determining module 520, a third determining module 530 and a fourth determining module 540.

The first determining module 510 is configured to, in response to acquiring a click operation on the virtual keyboard, determine a click position of the click operation.

The second determining module 520 is configured to determine a first probability that the click operation belongs to each key based on the click position and a response region currently corresponding to each key in the virtual keyboard.

The third determining module 530 is configured to determine a second probability that the click operation belongs to each key based on the input character sequence.

The fourth determining module 540 is configured to determine a target key corresponding to the click operation based on the first probability and the second probability for each key.

Optionally, the fourth determining module 540 is further configured to determine a probability that the next click operation belongs to each key based on the input character sequence and the target key.

Optionally, the apparatus further includes: an updating module 550, configured to update a response region for each key based on the probability that the next click operation belongs to each key.

Optionally, the updating module 550 is specifically configured to update a distribution weight for each key based on the probability that the next click operation belongs to each key; and determine the updated response region for each key based on the updated distribution weight for each key and a reference distribution region for each key.

Optionally, the updating module 550 is further configured to acquire historical operation data on the virtual keyboard, in which the historical operation data includes coordinates of historical click operations and a key that each of the historical click operations belongs to; and the reference distribution region for each key is determined based on the historical operation data.

Optionally, the updating module 350 is further configured to update a display mode of the each key based on the probability that the next click operation belongs to each key.

Optionally, the third determining module 530 is specifically configured to: determine a number of input characters to be acquired based on the current language input type of the virtual keyboard; acquire a character sequence with the number of the input characters from back to front based on an input order of each input character.

Alternatively, the fourth determining module 540 is specifically configured to: fuse the first probability and the second probability for each key to determine a click probability for each key; in response to the click probabilities for any two keys being the same and higher than the click probabilities for the remaining keys, determine one key in any two keys with a higher first probability as the target key.

It may be understood that, the first determining module 510, the second determining module 520, the third determining module 530 and the fourth determining module 540 in embodiments of the present disclosure may have the same function and structure with the first determining module 410, the second determining module 420, the third determining module 430 and the fourth determining module 440 in the above embodiments.

The functions and specific implementation principles of each module in embodiments of the present disclosure may refer to each of the method embodiments, which is not repeated here.

For the input apparatus in the embodiments of the present disclosure, the first probability that the click operation belongs to each key is determined based on the acquired click position of the click operation and the response region currently corresponding to each key in the virtual keyboard; the second probability that the click operation belongs to each key is determined based on the input character sequence; the click probability for the each key is determined based on the first probability and the second probability for each key, and the corresponding target key is further determined; the probability that the next click operation belongs to each key may be determined based on the input character sequence and the target key; the distribution weight for each key is updated based on the probability that the next click operation belongs to each key; the updated response region for each key is determined based on the updated distribution weight for each key and the reference distribution region for each key, and the response region for each key may be further updated. Thus, multi-dimensional analysis is performed on the click operation to update the distribution weight for each key, and the response region for each key may be then updated in time based on the reference distribution region for each key, thereby reducing the probability of false recognition and improving the input accuracy based on the virtual keyboard.

Figure 6:
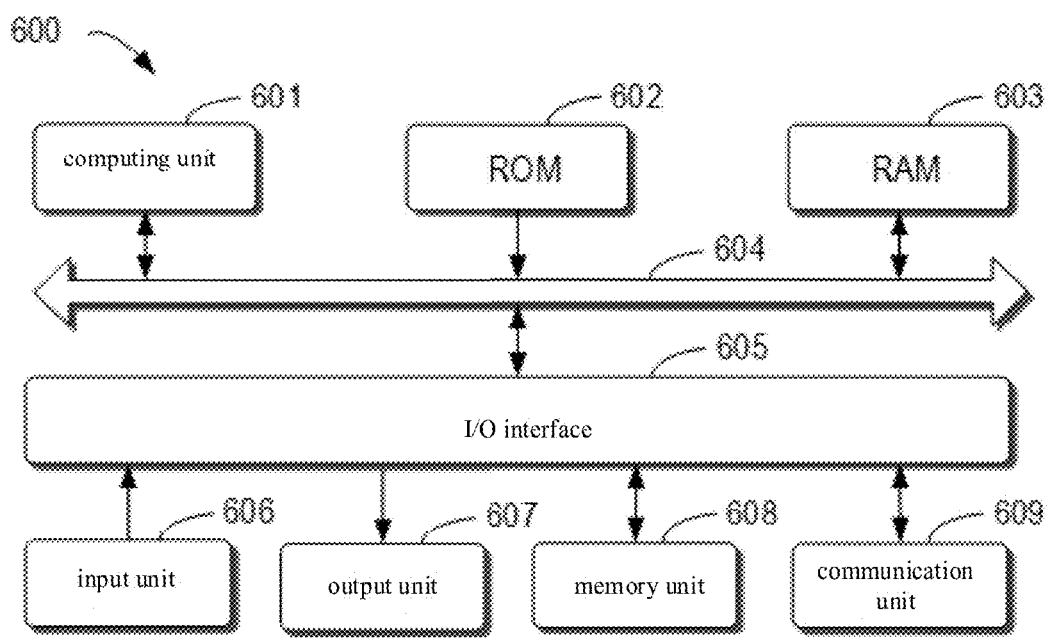
FIG. 6 is a block diagram illustrating an electronic device configured to implement an input method for a virtual keyboard in the embodiment of the present disclosure.

In the embodiment of the present disclosure, an electronic device, a readable storage medium and a computer program product are further provided according to embodiments of the present disclosure FIG. 6 is a schematic block diagram illustrating an example electronic device 600 in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile devices, such as personal digital assistants, cellular phones, smart phones, wearable devices, and other similar computing devices. The components shown herein, their connections and relations, and their functions are merely exemplary, and are not intended to limit the implementation of the disclosure described and/or required herein.

As shown in FIG. 6, a device 600 includes a computing unit 601, configured to execute various appropriate actions and processes according to a computer program stored in a read-only memory (ROM) 602 or loaded from a memory unit 608 to a random access memory (RAM) 603, In the RAM 603, various programs and data required for the device 600 may be stored. The computing unit 601, the ROM 602 and the ROM 603 may be connected with each other via a bus 604. An input/output (I/O) interface 605 is also connected to the bus 604.

A plurality of components in the device 600 are connected to the I/O interface 605, and include: an input unit 606, for example, a keyboard, a mouse, etc.; an output unit 607, for example various types of displays, speakers; a memory unit 608, for example a magnetic disk, an optical disk; and a communication unit 609, for example, a network card, a modem, a wireless transceiver. The communication unit 609 allows the device 600 to exchange information/data with other devices through a computer network such as the Internet and/or various types of telecommunication networks.

The computing unit 601 may be various types of general and/or dedicated processing components with a processing and computing ability. Some examples of the computing unit 601 include but not limited to a central processing unit (CPU), a graphics processing unit (GPU), various dedicated artificial intelligence (AI) computing chips, various computing units running a machine learning model algorithm, a digital signal processor (DSP), and any appropriate processors, controllers, microcontrollers, etc. The computing unit 601 executes various methods and processes as described above, for example, an input method for a virtual keyboard. For example, in some embodiments, an input method for a virtual keyboard may be further implemented as a computer software program, which is tangibly contained in a machine readable medium, such as the memory unit 608. In some embodiments, a part or all of the computer programs may be loaded and/or installed on the device 600 through the ROM 602 and/or the communication unit 609. When the computer program is loaded on the RAM 603 and executed by the computing unit 601, one or more steps in the input method for a virtual keyboard as described above may be performed. Alternatively, in other embodiments, the computing unit 601 may be configured to execute the input method for a virtual keyboard in other appropriate ways (for example, by virtue of a firmware).

Various embodiments of systems and technologies described herein may be implemented in a digital electronic circuit system, an integrated circuit system, a field programmable gate array (FPGA), a dedicated application specific integrated circuit (ASIC), a system on a chip (SoC), a load programmable logic device (CPLD), a computer hardware, a firmware, a software, and/or combinations thereof. The various embodiments may include: being implemented in one or more computer programs that may be executed and/or interpreted on a programmable system including at least one programmable processor, in which the programmable processor may be a dedicated or a general-purpose programmable processor that may receive/transmit data and instructions from/to a storage system, at least one input device, and at least one output device.

A computer code configured to execute a method in the present disclosure may be written with one or any combination of multiple programming languages. These programming languages may be provided to a processor or a controller of a general purpose computer, a dedicated computer, or other apparatuses for processing programmable data so that the function/operation specified in the flowchart and/or block diagram may be performed when the program code is executed by the processor or controller. The computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. The machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of the machine readable storage medium includes an electronic connection with one or more cables, a portable computer disk, a hardware, a random access memory (RAM), a read-only memory (ROM), an erasable programmable read-only memory (an EPROM or a flash memory), an optical fiber device, and a portable optical disk read-only memory (CD-ROTS), an optical storage device, a magnetic storage device, or any appropriate combination of the above.

In order to provide interactions with the user, the systems and technologies described here may be implemented on a computer which includes: a display apparatus for displaying information to the user (for example, a cathode ray tube (CRT) or a liquid crystal display (LCD) monitor); and a keyboard and a pointing apparatus (for example, a mouse or a trackball) through which the user may provide inputs to the computer. Other types of devices may further be configured to provide interactions with the user; for example, the feedback provided to the user may be any form of sensory feedback (for example, a visual feedback, an auditory feedback, or a tactile feedback); and inputs from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation means of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an Internet and a blockchain network.

The computer system may include a client and a server. The client and server are generally far away from each other and generally interact with each other through a communication network. The relation between the client and the server is generated by computer programs that run on the corresponding computers and have a client-server relationship with each other. The server may be a cloud server, also known as a cloud computing server or a cloud host, is a host product in a cloud computing service system, to solve the shortcomings of large management difficulty and weak business expansibility existed in the traditional physical host and virtual private server (VPS) service. The server may also be a server with a distributed system, or a server in combination with a blockchain.

In the technical solution in the present disclosure, the first probability that the click operation belongs to each key is determined based on the acquired click position of the click operation and the response region currently corresponding to each key in the virtual keyboard; the second probability that the click operation belongs to each key is determined based on the input character sequence; the target key corresponding to the click operation is determined based on the first probability and the second probability for each key. Thus, multi-dimensional analysis is performed on the click operation to determine a target key, thereby reducing the probability of false recognition and improving the input accuracy based on the virtual keyboard.

It should be understood that, various forms of procedures shown above may be configured to reorder, add or delete the actions. For example, the actions described in the present disclosure may be executed in parallel, sequentially, or in a different order, as long as the desired result of the technical solution disclosed in the present disclosure may be achieved, which is not limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. An input method for a virtual keyboard, comprising:
in response to acquiring a click operation on the virtual keyboard, determining a click position of the click operation;
determining a first probability that the click operation belongs to each key based on the click position and a current response region corresponding to each key in the virtual keyboard;
determining a second probability that the click operation belongs to each key based on an input character sequence; and
determining a target key corresponding to the click operation based on the first probability and the second probability for each key;
wherein determining the target key corresponding to the click operation based on the first probability and the second probability for each key, comprises:
fusing the first probability and the second probability for each key, to determine a click probability for each key; and
in response to the click probabilities for any two keys being the same and higher than click probabilities for the remaining keys, determining one key in the any two keys with a higher first probability as the target key.

2. The method of claim 1, wherein, after determining the target key corresponding to the click operation, the method further comprises:
determining a probability that the next click operation belongs to each key based on the input character sequence and the target key; and
updating the current response region for each key based on the probability that the next click operation belongs to each key.

3. The method of claim 2, wherein, updating the current response region for each key, comprises:
updating a distribution weight for each key based on the probability that the next click operation belongs to each key; and
determining the updated current response region for each key based on the updated distribution weight for each key and a reference distribution region for each key.

4. The method of claim 3, further comprising:
acquiring historical operation data on the virtual keyboard, wherein the historical operation data comprises coordinates of historical click operations and a key that each of the historical click operations belongs to; and
determining the reference distribution region for each key based on the historical operation data.

5. The method of claim 2, wherein, after determining the probability that the next click operation belongs to each key, the method further comprises:
updating a display mode of each key based on the probability that the next click operation belongs to each key.

6. The method of claim 1, wherein, before determining the second probability that the click operation belongs to each key based on the input character sequence, the method further comprises:
determining a number of input characters to be acquired based on a current language input type of the virtual keyboard; and
acquiring a character sequence with the same number of the input characters from back to front based on an input order of each input character.

7. The method of claim 1, wherein when the response region for each key is represented by a Gaussian distribution, the first probability is calculated by:

$$p(c|v) = \frac{\phi^* N(v|\mu_c, \theta_c)}{\sum_{j=1}^{K} \phi^* N(v|\mu_j, \theta_j)}$$

where v represents the click operation and V=(x, y), in which x and y are an abscissa and an ordinate for the click position; N represents a Gaussian distribution corresponding to a certain key C; φ represents a distribution weight for the certain key C; $\mu_c$ represents a mean of the Gaussian distribution for the certain key C and $\theta_c$ is a variance of the Gaussian distribution for the certain key C; $\mu_j$ represents a mean of the Gaussian distribution for any key j in the virtual keyboard and $\theta_j$ represents a variance of the Gaussian distribution for the key j; and K represents a number of keys in the virtual keyboard.

8. An electronic device, comprising:
at least one processor; and
a memory stored with instructions executable by the at least one processor;
wherein the at least one processor is configured to:
in response to acquiring a click operation on the virtual keyboard, determine a click position of the click operation;
determine a first probability that the click operation belongs to each key based on the click position and a current response region corresponding to each key in the virtual keyboard;
determine a second probability that the click operation belongs to each key based on an input character sequence;
determine a target key corresponding to the click operation based on the first probability and the second probability for each key;
wherein the at least one processor is further configured to:
fuse the first probability and the second probability for the each key, to determine a click probability for each key;
in response to the click probability for any two keys being the same and higher than the click probabilities for the remaining keys, determine one key in the any two keys with a higher first probability as the target key.

9. The electronic device of claim 8, wherein, the at least one processor is further configured to:
determine a probability that the next click operation belongs to each key based on the input character sequence and the target key;
update the current response region for the each key based on the probability that the next click operation belongs to each key.

10. The electronic device of claim 9, wherein the at least one processor is further configured to:
update a distribution weight for the each key based on the probability that the next click operation belongs to each key;
determine the updated current response region for each key based on the updated distribution weight for the each key and a reference distribution region for each key.

11. The electronic device of claim 10, wherein, the at least one processor is further configured to:
acquire historical operation data on the virtual keyboard, wherein the historical operation data comprises coordinates of historical click operations and a key that each of the historical click operations belongs to;
determine the reference distribution region for each key based on the historical operation data.

12. The electronic device of claim 9, wherein the at least one processor is further configured to:
update a display mode of the each key based on the probability that the next click operation belongs to each key.

13. The electronic device in claim 8, wherein the at least one processor is further configured to:

determine a number of input characters to be acquired based on a current language input type of the virtual keyboard;
acquire a character sequence with the same number of the input characters from back to front based on an input order of each input character.

14. The electronic device of claim 8, wherein when the response region for each key is represented by a Gaussian distribution, the first probability is calculated by:

$$p(c|v) = \frac{\phi^* N(v|\mu_c, \theta_c)}{\sum_{j=1}^{K} \phi^* N(v|\mu_j, \theta_j)}$$

where v represents the click operation and V=(x, y), in which x and y are an abscissa and an ordinate for the click position; N represents a Gaussian distribution corresponding to a certain key C; $\phi$ represents a distribution weight for the certain key C; $\mu_c$ represents a mean of the Gaussian distribution for the certain key C and $\theta_c$ is a variance of the Gaussian distribution for the certain key C; $\mu_j$ represents a mean of the Gaussian distribution for any key j in the virtual keyboard and $\theta_j$ represents a variance of the Gaussian distribution for the key j; and K represents a number of keys in the virtual keyboard.

15. A non-transitory computer-readable storage medium having computer instructions stored thereon, wherein the computer instructions are configured to cause a computer to execute an input method for a virtual keyboard, the method comprising:
in response to acquiring a click operation on the virtual keyboard, determining a click position of the click operation;
determining a first probability that the click operation belongs to each key based on the click position and a current response region corresponding to each key in the virtual keyboard;
determining a second probability that the click operation belongs to each key based on an input character sequence; and
determining a target key corresponding to the click operation based on the first probability and the second probability for each key;
wherein determining the target key corresponding to the click operation based on the first probability and the second probability for each key, comprises:
fusing the first probability and the second probability for each key, to determine a click probability for each key; and
in response to the click probabilities for any two keys being the same and higher than click probabilities for the remaining keys, determining one key in the any two keys with a higher first probability as the target key.

16. The storage medium of claim 15, wherein after determining the target key corresponding to the click operation, the method further comprises:
determining a probability that the next click operation belongs to each key based on the input character sequence and the target key; and
updating the current response region for each key based on the probability that the next click operation belongs to each key.

17. The storage medium of claim 16, wherein updating the current response region for each key, comprises:

updating a distribution weight for each key based on the probability that the next click operation belongs to each key;

acquiring historical operation data on the virtual keyboard, wherein the historical operation data comprises coordinates of historical click operations and a key that each of the historical click operations belongs to;

determining a reference distribution region for each key based on the historical operation data; and determining the updated current response region for each key based on the updated distribution weight for each key and the reference distribution region for each key.

18. The storage medium of claim 16, wherein, after determining the probability that the next click operation belongs to each key, the method further comprises:

updating a display mode of each key based on the probability that the next click operation belongs to each key.

19. The storage medium of claim 15, wherein, before determining the second probability that the click operation belongs to each key based on the input character sequence, the method further comprises:

determining a number of input characters to be acquired based on a current language input type of the virtual keyboard; and acquiring a character sequence with the same number of the input characters from back to front based on an input order of each input character.

20. The storage medium of claim 15, wherein when the response region for each key is represented by a Gaussian distribution, the first probability is calculated by:

$$p(c|v) = \frac{\phi^* N(v|\mu_c, \theta_c)}{\sum_{j=1}^{K} \phi^* N(v|\mu_j, \theta_j)}$$

where v represents the click operation and V=(x, y), in which x and y are an abscissa and an ordinate for the click position; N represents a Gaussian distribution corresponding to a certain key C; $\phi$ represents a distribution weight for the certain key C; $\mu_c$ represents a mean of the Gaussian distribution for the certain key C and $\theta_c$ is a variance of the Gaussian distribution for the certain key C; $\mu_j$ represents a mean of the Gaussian distribution for any key j in the virtual keyboard and $\theta_j$ represents a variance of the Gaussian distribution for the key j; and K represents a number of keys in the virtual keyboard.

* * * * *